United States Patent [19]

Moon

[11] Patent Number: 6,166,776
[45] Date of Patent: Dec. 26, 2000

[54] MULTI-RECEIVING DEMODULATOR FOR DEMODULATING SIGNALS RECEIVED FROM MULTIPLE BROADCASTING SYSTEMS

[75] Inventor: Byoung-cho Moon, Suwon, Rep. of Korea

[73] Assignee: Samsung Electronics Co., Ltd., Kyungki-Do, Rep. of Korea

[21] Appl. No.: 09/008,103

[22] Filed: Jan. 16, 1998

[30] Foreign Application Priority Data

Jan. 17, 1997 [KR] Rep. of Korea ......................... 97-1307

[51] Int. Cl.[7] ...................................... H04N 5/46
[52] U.S. Cl. ...................... 348/555; 348/726; 348/558; 348/738
[58] Field of Search ................... 348/736, 554, 348/555, 558, 738, 725, 226, 557

[56] References Cited

U.S. PATENT DOCUMENTS

| | | | |
|---|---|---|---|
| 4,688,082 | 8/1987 | Kato | 348/555 |
| 5,355,162 | 10/1994 | Yazolino et al. | 348/11 |
| 5,467,141 | 11/1995 | Ligertwood | 348/555 |
| 5,663,768 | 9/1997 | Yang | 348/557 |
| 5,673,088 | 9/1997 | Nah | 348/738 |
| 5,953,072 | 9/1999 | Lim | 348/555 |
| 5,956,098 | 9/1999 | Mizukami et al. | 348/735 |

*Primary Examiner*—Victor R. Kostak
*Attorney, Agent, or Firm*—Sughrue, Mion, Zinn, Macpeak & Seas, PLLC

[57] ABSTRACT

There is provided a multi-receiving demodulator for receiving broadcasting signals from multiple broadcasting systems. The multi-receiving demodulator has a first band pass filter for selectively band-pass-filtering an intermediate frequency output from a tuner to obtain a color subcarrier corresponding to the broadcasting system of a received signal, according to a first control signal, and a second band pass filter for selectively band-pass-filtering the intermediate frequency output from the tuner to obtain an audio carrier corresponding to the broadcasting system of the received signal, according to a second control signal. A video demodulating portion receives the color subcarrier from the first band pass filter and selectively demodulates a video signal corresponding to the broadcasting system of the received signal in accordance with the second control signal. An audio demodulating portion receives the audio carrier from the second band pass filter and selectively demodulates an audio signal corresponding to the broadcasting system of the received signal in accordance with the second control signal. A controller detects a power source frequency and channel selection data, and provides the first and second control signals to the first and second band pass filters and the video and audio demodulating portions in accordance with the detected power source frequency and channel control signals.

10 Claims, 3 Drawing Sheets

MULTI-RECEIVING DEMODULATOR FOR DEMODULATING SIGNALS RECEIVED FROM MULTIPLE BROADCASTING SYSTEMS

BACKGROUND OF THE INVENTION

1. Field of the Invention

The present invention relates to a multi-receiving demodulator, and more particularly, to a multi-receiving demodulator for receiving broadcast signals from all over the world.

2. Description of the Related Art

Many different TV broadcasting systems exist in the world. That is, there are M, I, B/G, D/K, and L systems for both VHF and UHF transmission systems. Multi-receiving systems have been developed to receive signals from these TV systems. However, the L system employed in Europe has a VHF channel bandwidth of 7 MHz and a UHF channel bandwidth of 8 MHz. For the L system, vestigial side-band (VSB) positive modulation is used as a video modulation method, and amplitude modulation (AM) is used as an audio modulation method. Furthermore, a VHF low channel (hereinafter, referred to as L') and a VHF high channel and UHF channel (hereinafter, referred to as L) should be differently constituted in the L system, as compared to other systems M, I, B/G, and D/K, because the former and the latter perform different heterodyning. Therefore, the receiver in a multi-system TV often excludes the L system to avoid the necessary complicated demodulation circuitry, and thus has difficulty in receiving TV broadcast signals from countries or areas adopting the L system.

SUMMARY OF THE INVENTION

To solve the above problem, it is an object of the present invention to provide a multi-receiving demodulator for receiving broadcast signals from all over the world, by employing multiple systems including M, I, B/G, D/K, and L systems.

To achieve the above object, there is provided a multi-receiving demodulator for demodulating a received signal employing any of multiple broadcasting systems, comprising: a tuner for tuning into a predetermined frequency from a received radio frequency signal, mixing the tuned frequency with a local oscillation frequency, and generating an intermediate frequency; a first band pass filter for selectively band-pass-filtering the intermediate frequency generated by the tuner to obtain a color subcarrier corresponding to the broadcasting system of the received signal, according to a first control signal; a second band pass filter for selectively band-pass-filtering the intermediate frequency generated by the tuner to obtain an audio carrier corresponding to the broadcasting system of the received signal, according to a second control signal; video demodulating means for receiving the color subcarrier from the first band pass filter and selectively demodulating a video signal corresponding to the broadcasting system of the received signal, according to the second control signal; audio demodulating means for receiving the audio carrier from the second band pass filter and selectively demodulating an audio signal corresponding to the broadcasting system of the received signal, according to the second control signal; and controlling means for detecting a power source frequency and channel selection data, and applying the first and second control signals to the first and second band pass filters and the video and audio demodulating means according to the detected power source frequency and channel selection data.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Figure 1:
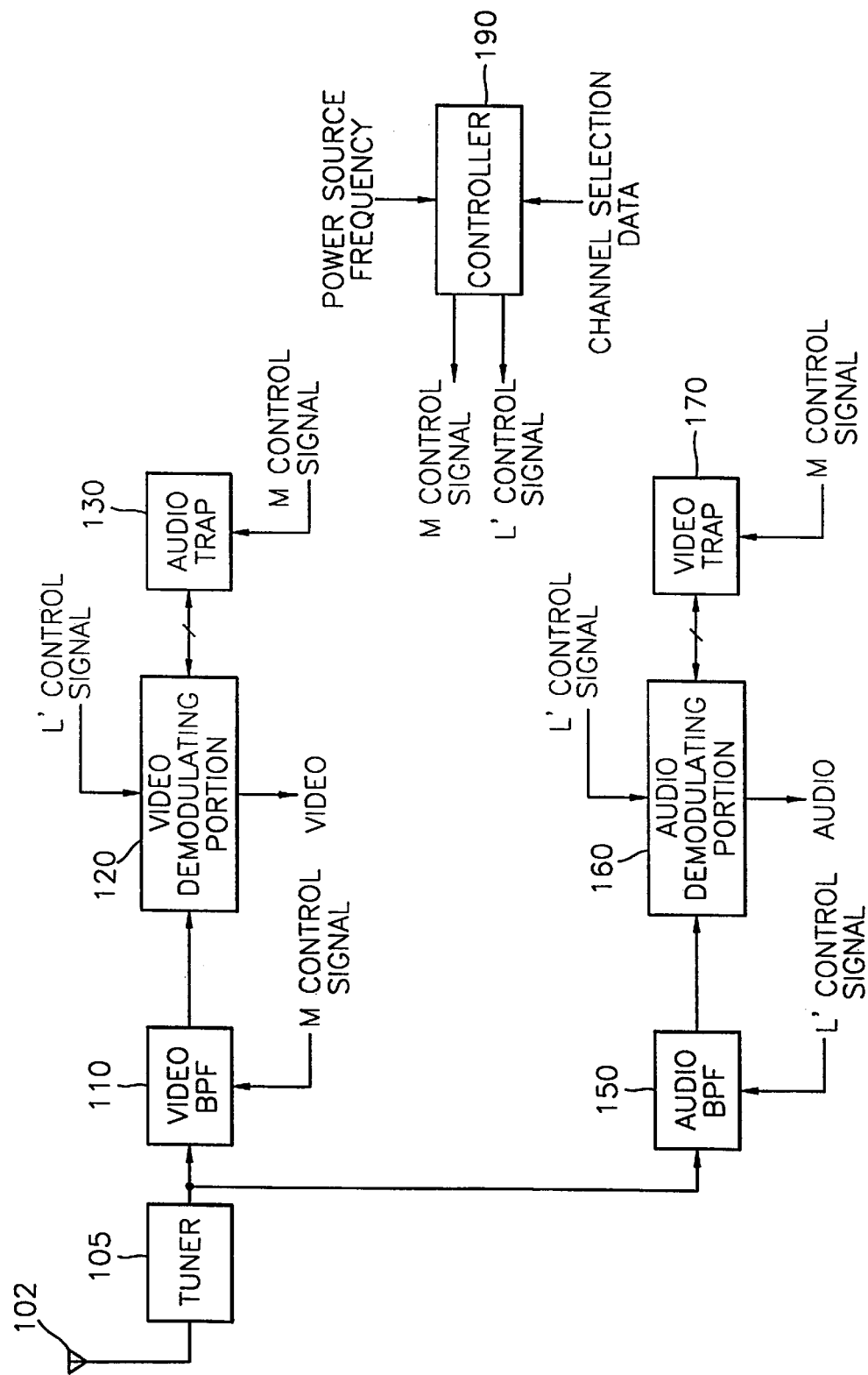
FIG. 1 is a block diagram of a multi-receiving demodulator according to the present invention.

In FIG. 1, a multi-receiving demodulator of the present invention has a tuner 105 for converting a radio frequency (RF) received via an antenna 102 to an intermediate frequency (IF), a video band pass filter (BPF) 110 for passing a color subcarrier from the intermediate frequency according to an M control signal, a video demodulating portion 120 for demodulating a video signal according to an L' control signal, an audio trap 130 for trapping an audio carrier according to the M control signal, an audio BPF 150 for passing the intermediate frequency of an audio carrier component from the intermediate frequency, an audio demodulating portion 160 for demodulating an audio signal according to the L' control signal, a video trap 170 for trapping the color subcarrier according to the M control signal, and a controller 190 for generating the M and L' control signals according to a power source frequency and channel selection data.

The tuner 105 shown in FIG. 1 tunes into a predetermined frequency from the radio frequency signal received via the antenna 102, mixes the tuned frequency with a local oscillating frequency generated in an internal oscillator, and outputs an intermediate frequency. The video BPF 110 and the audio BPF 150 band-pass-filter a color subcarrier and audio intermediate frequency from the intermediate frequency generated by the tuner 105. The video demodulating portion 120 and the audio demodulating portion 160 demodulate a carrier-free video signal and an audio signal by operating video and audio detections on the color subcarrier and the audio intermediate frequency received from the video BPF 110 and the audio BPF 150. Here, the audio demodulating portion 160 includes a processor for processing AM and FM. The audio trap 130 suppresses interference with the video signal of the video demodulating portion 120 by trapping an audio carrier component for each broadcasting method, and the video trap 170 suppresses interference with the audio signal of the audio demodulating portion 160 by trapping a video carrier component for each broadcasting method. The controller 190 detects a power source frequency (60 Hz or 50 Hz) for each country. That is, the M control signal of the controller 190 becomes a high pulse signal for selecting the M system if the detected power source frequency is 60 Hz, and a low pulse signal for selecting the B/G, I, D/K, and L systems if the detected power source frequency is 50 Hz. In addition, the controller 190 generates the L' control signal by detecting a high-frequency band corresponding to a selected channel, using channel data stored in the controller 190. That is, the controlling portion 190 outputs the L' control signal being a high pulse signal if the detected high-frequency band is the VHF low band of the L system, and outputs the L' control signal being a low pulse signal if the detected high-frequency band is the B/G, M, D/K, or L (VHF high, and UHF) band. Hence, in order to make a distinction between an NTSC method and a PAL method, the video BPF 110 passes the color subcarrier (picture-color space (a): 3.58 MHz) of the M system as shown in table 1 if the M control signal is high, and the color subcarrier (picture-color space (a): 4.43 MHz) of the B/G, I, D/K, and L systems as shown in table 1 if the M control signal is low. The audio BPF 150 passes the intermediate frequency (40.9 MHz) of the audio carrier component of the VHF low band in the L system as shown in table 1, if the L' control signal is high, and the intermediate frequency (32.4–34.3 MHz) of the audio carrier component of the B/G, I, D/K, M, and (VHF high and UHF bands of) L systems if the L' control signal is low. In the video demodulating portion 120, detection is performed by a voltage controlled oscillator (VCO). The 34.4 MHz intermediate frequency (the VHF low band of the L system) as shown in table 1 is selected for the detection if the L' control signal is high, and the 38.9 MHz intermediate frequency (B/G, I, D/K, M, and VHF high and UHF bands of L) is selected if the L' control signal is low. In the audio demodulating portion 160, detection is performed by a VCO. A 40.9 MHz intermediate frequency (the VHF low band of the L system) as shown in table 1 is selected for the detection if the L' control signal is high, and the 32.4–34.4 MHz intermediate frequency (B/G, I, D/K, M, and VHF high and UHF bands of L) is selected if the L' control signal is low.

The audio trap 130 traps the picture-sound space of the M system as shown in table 1 if the M control signal is high, and that of the B/G, I, D/K, and L systems if the M control signal is low. The video trap 170 traps the picture-color space of the M system as shown in table 1 if the M control signal is high, and that of the B/G, I, D/K, and L systems if the M control signal is low.

Figure 2:
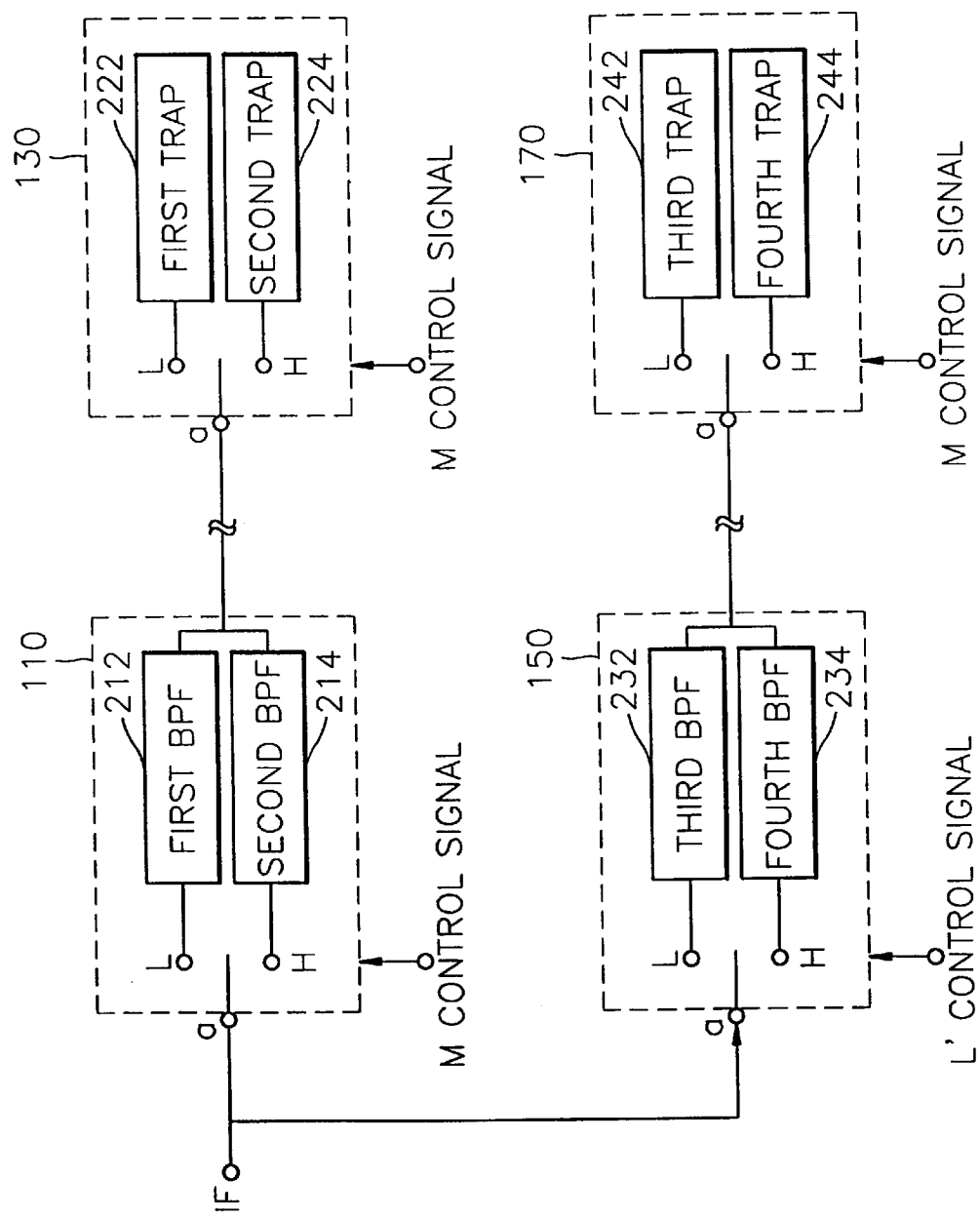
FIG. 2 is a detailed block diagram of the video band pass filter (BPF), the audio BPF, the audio trap, and the video trap shown in FIG. 1.

FIG. 2 is a detailed block diagram of the video BPF 110, the audio BPF 150, the audio trap 130 and the video trap 170.

Figure 3:
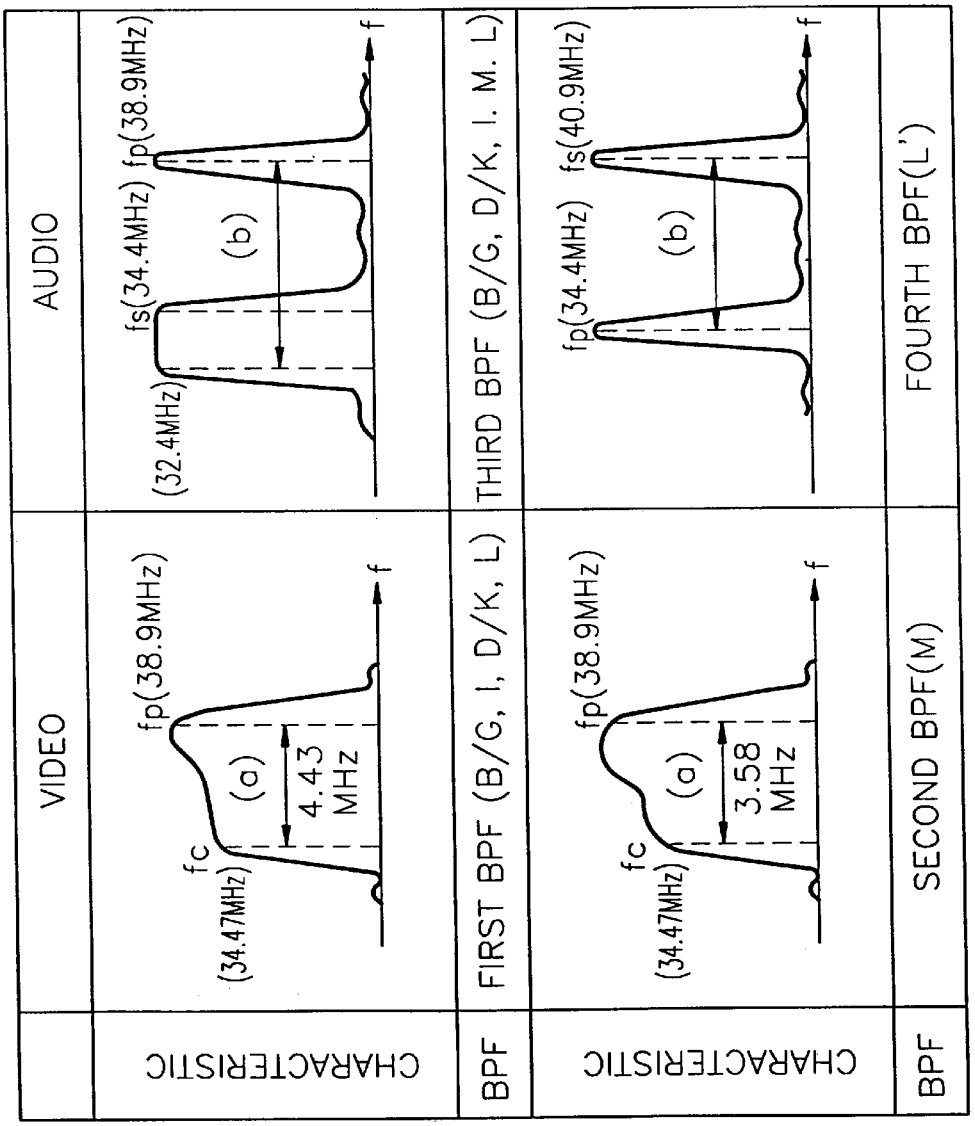
FIG. 3 illustrates video and audio BPF characteristics of respective systems.

FIG. 3 illustrates video and audio BPF characteristics for each broadcasting system. Here, $f_c$ denotes a color intermediate frequency, $f_p$ denotes a picture intermediate frequency, and $f_s$ denotes a sound intermediate frequency.

In FIG. 2, the video BPF 110 includes first and second BPFs 212 and 214. An intermediate frequency IF is selectively input to one of the first and second BPFs 212 and 214 according to the M control signal generated in the controller 190. For example, if the M control signal is high, a contact point (a) is connected to a contact point (H) and the intermediate frequency is input to the second BPF 214. Thus, the second BPF 214 passes only the 3.58 MHz(a) color subcarrier of the M system as in the second BPF(M) shown in FIG. 3. In addition, when the M control signal is low, the contact point (a) is connected to a contact point (L), and the intermediate frequency is input to the first BPF 212. Hence, the first BPF 212 passes only the 4.43 MHz(a) color subcarrier of the B/G, I, D, D/K, and L systems as in the first BPF(B/G, I, D/K, L) shown in FIG. 3.

The audio BPF 150 includes third and fourth BPFs 232 and 234. The intermediate frequency is selectively input to one of the third and fourth BPFs 232 and 234 according to the L' control signal generated in the controller 190. For example, when the L' control signal is high, the contact point (a) is connected to the contact point (H) and the intermediate frequency is input to the fourth BPF 234. Thus, the fourth BPF 234 passes the intermediate frequency 40.9 MHz of an audio carrier component of the VHF low band in the L system as in the fourth BPF(L') shown in FIG. 3. On the other hand, if the L' control signal is low, the contact point (a) is connected to the contact point (L), and the intermediate frequency is input to the third BPF 232. Thus, the third BPF 232 passes the intermediate frequency (32.4–34.4 MHz) of an audio carrier component in the B/G, I, D/K, L (VHF high and UHF) systems, as in the third BPF(B/G, I, D/K, L) shown in FIG. 3.

The audio trap 130 includes first and second traps 222 and 224, and is controlled by the M control signal generated in the controller 190. That is, when the M control signal is high, the contact point (a) is connected to the contact point (H) and the second trap 224, which is a 4.5 MHz trap of the M system shown in table 1, is selected. If the M control signal is low, the contact point (a) is connected to the contact point (L) and the first trap 222, which is a 5.5–6.5 MHz trap of the B/G, I, D/K, and L systems shown in table 1, is selected.

The video trap 170 includes third and fourth traps 242 and 244, and is controlled by the M control signal generated in the controller 190. That is, when the M control signal is high, the contact point (a) is connected to the contact point (H) and the fourth trap 244, which is a 3.58 MHz trap of the M system shown in table 1, is selected. On the other hand, if the M control signal is low, the third trap 242, which is a 4.43 MHz trap of the B/G, I, D/K, and L systems shown in table 1, is selected.

TABLE 1

| broadcast system | video carrier (IF) | color carrier (IF) | audio carrier (IF) | picture-color space (a) | picture-sound space (b) | audio modulation |
|---|---|---|---|---|---|---|
| M | 38.9 MHz | 35.32 MHz | 34.4 MHz | 3.58 MHz | 4.5 MHz | FM |
| B/G | 38.9 MHz | 34.47 MHz | 33.47 MHz | 4.43 MHz | 5.5 MHz | FM |
| I | 38.9 MHz | 34.47 MHz | 32.9 MHz | 4.43 MHz | 6.0 MHz | FM |
| D/K | 38.9 MHz | 34.47 MHz | 32.9 MHz | 4.43 MHz | 6.5 MHz | FM |
| L | 38.9 MHz | 34.47 MHz | 32.9 MHz | 4.43 MHz | 6.5 MHz | AM |
| L' | 34.4 MHz | 38.83 MHz | 40.9 MHz | 4.43 MHz | 6.5 MHz | AM |

As described above, the present invention can receive broadcasting signals from all over the world by employing multiple systems including M, I, B/G, D/K, and I systems.

While the present invention has been illustrated and described with reference to a specific embodiment, further modifications and alterations within the spirit and scope of this invention will occur to those skilled in the art.

What is claimed is:

1. A multi-receiving demodulator for demodulating signals received from multiple broadcasting systems, comprising:

a tuner for tuning to a predetermined frequency from a received radio frequency signal and mixing the tuned predetermined frequency with a local oscillation frequency to generate an intermediate frequency;

a first band pass filter for band pass filtering the intermediate frequency generated by said tuner to provide a color subcarrier corresponding to a broadcasting system of the received signal, in accordance with a first control signal;

a second band pass filter for band-pass-filtering the intermediate frequency generated by said tuner to provide an audio carrier corresponding to the broadcasting system of the received signal, in accordance with a second control signal;

video demodulating means for receiving the color subcarrier provided by said first band pass filter and demodulating a video signal corresponding to the broadcasting system of the received signal, in accordance with the second control signal;

audio demodulating means for receiving the audio carrier provided by said second band pass filter and demodulating an audio signal corresponding to the broadcasting system of the received signal, in accordance with the second control signal; and controlling means for detecting a frequency of a power source which supplies power to the multi-receiving demodulator and channel selection data, and applying the first and second control signals to said first and second band pass filters and said video and audio demodulating means in accordance with the detected frequency of the power source and channel selection data.

2. The multi-receiving demodulator of claim 1, further comprising audio trap means for trapping the audio signal corresponding to the broadcasting system of the received signal in accordance with the first control signal, and providing the trapped audio signal to said video demodulating means to suppress interference with the video signal.

3. The multi-receiving demodulator of claim 1, further comprising video trap means for trapping the video signal corresponding to the broadcasting system of the received signal in accordance with the first control signal, and providing the trapped video signal to said audio demodulating means to suppress interference with the audio signal.

4. The multi-receiving demodulator of claim 1, wherein the first control signal of said controlling means selects an M system if the detected frequency of the power source is 60 Hz, and selects B/G, I, D/K, and L systems if the detected frequency of the power source is 50 Hz.

5. The multi-receiving demodulator of claim 1, wherein the second control signal of said controlling means selects either the L system (VHF low band) or the B/G, I, D/K, and M systems, based on the channel selection data.

6. A multi-receiving demodulator for demodulating signals received from multiple broadcasting systems, comprising:

a tuner for tuning to a predetermined frequency from a received radio frequency signal and mixing the tuned predetermined frequency with a local oscillation frequency to generate an intermediate frequency;

a first band pass filter for band pass filtering the intermediate frequency generated by said tuner to provide a color subcarrier corresponding to a broadcasting system of the received signal, in accordance with a first control signal;

a second band pass filter for band-pass-filtering the intermediate frequency generated by said tuner to provide an audio carrier corresponding to the broadcasting system of the received signal, in accordance with a second control signal;

a video demodulator for receiving the color subcarrier provided by said first band pass filter and demodulating a video signal corresponding to the broadcasting system of the received signal, in accordance with the second control signal;

an audio demodulator for receiving the audio carrier provided by said second band pass filter and demodulating an audio signal corresponding to the broadcasting system of the received signal, in accordance with the second control signal; and a controller for detecting a frequency of a power source which supplies power to the multi-receiving demodulator and channel selection data, and applying the first and second control signals to said first and second band pass filters and said video and audio demodulators in accordance with the detected frequency of the power source and channel selection data.

7. The multi-receiving demodulator of claim 6, further comprising an audio trap for trapping the audio signal corresponding to the broadcasting system of the received signal in accordance with the first control signal, and providing the trapped audio signal to said video demodulator to suppress interference with the video signal.

8. The multi-receiving demodulator of claim 6, further comprising a video trap for trapping the video signal corresponding to the broadcasting system of the received signal in accordance with the first control signal, and providing the trapped video signal to said audio demodulator to suppress interference with the audio signal.

9. The multi-receiving demodulator of claim 6, wherein the first control signal of said controller selects an M system if the detected frequency of the power source is 60 Hz, and selects B/G, I, D/K, and L systems if the detected frequency of the power source is 50 Hz.

10. The multi-receiving demodulator of claim 6, wherein the second control signal of said controller selects either the L system (VHF low band) or the B/G, I, D/K, and M systems, based on the channel selection data.

* * * * *